Feb. 13, 1973  H. A. TERWILLIGER  3,716,073

ROTARY PLUG SHUT-OFF VALVE ASSEMBLY

Filed April 7, 1969

INVENTOR
H. ALAN TERWILLIGER

BY *Joseph L. Connorton*
ATTORNEY

United States Patent Office 3,716,073
Patented Feb. 13, 1973

3,716,073
ROTARY PLUG SHUT-OFF VALVE ASSEMBLY
H. Alan Terwilliger, 30 Arlmont St.,
Kingston, N.Y. 12401
Continuation-in-part of application Ser. No. 501,873,
Oct. 22, 1965. This application Apr. 7, 1969, Ser.
No. 824,339
Int. Cl. F16k 43/00
U.S. Cl. 137—613                                     1 Claim

ABSTRACT OF THE DISCLOSURE

A combined rotary plug shut-off valve includes a rotary plug section having inlet and outlet port sections at opposite ends of a flow passage for supplying domestic gas to a burner unit. A flow limiting device having an opening adapted to register with the flow passage of the valve is mounted between the inlet and outlet port sections, and adapted for rotational adjustment with respect to the flow passage for obstructing the gas flow through the rotary plug to permit servicing of said rotary plug or its associated burner unit without retarding the main gas supply.

---

This application is a continuation of application Ser. No. 501,873, "Rotary Plug Valve" filed by H. Alan Terwilliger, Oct. 22, 1965.

The present invention relates to valves and more particularly to a combination rotary plug shut-off valve adapted to facilitate repair of the rotary plug or its associated burner unit.

In conventional gas burner installations, rotary plug valves are commonly used in supply line for domestic gas, being normally mounted near or in a burner unit such as the burners of a gas stove, and used to control the flow of gas thereto. To service the burner units or the plug itself in conventional installations, it is necessary to shut off the flow of gas usually through an external source such as a shut-off valve in the main line. This is particularly objectionable in a commercial installation where a bank of units are connected through their respective manifolds to a common main whereby service of one burner unit interrupts the supply to the entire bank.

In accordance with the present invention, there is provided an improved combination rotary plug and shut-off valve adapted for installation with individual burner units whereby any single unit or the rotary plug itself may be serviced by utilizing the shut-off portion of the valve without interrupting service to the remaining units in the bank. In addition to the rotary plug section, the valve includes a shut-off section, the latter section being connected in the passage between inlet and outlet ports. In one preferred embodiment of the invention, the shut-off portion of the valve comprises a tapered pin having an opening therethrough which is positioned through the valve casing near the inlet port. When the shut-off section of the valve is in its normal or open position, the passing of fluid through the valve casing is completely unobstructed. The tapered pin has one terminal designed for rotationed engagement by a screwdriver to control the fluid passage through the shut-off portion of the valve. Associated with the opposite terminal of the tapered pin is a threaded member also adapted for rotational engagement to bring the pin into firm contact with the entire inner periphery of the opening in the casing through which the pin extends to prevent leakage of gas therethrough. When the cut-off section of the valve is turned to the off position, the rotary plug or the burner unit which it supplies can be removed and readily serviced. The device is reliable, simple, convenient, and inexpensive in construction or fabrication, particularly by comparison with the several units which it replaces.

Accordingly, a primary object of the present invention is to provide an improved rotary plug.

Another object of the present invention is to provide a combination rotary plug and shut-off valve.

Another object of the present invention is to provide an improved rotary plug adaptable for self-servicing without auxiliary shut-off.

Still another object of the present invention is to provide an improved rotary plug adapted to permit servicing of individual burner units in a bank without interrupting the gas supply to the remaining units.

The foregoing and other objects, features, and advantages of the invention will be apparent from the following more particular description of preferred embodiments of the invention, as illustrated in the accompanying drawings, in which.

Figure 1:
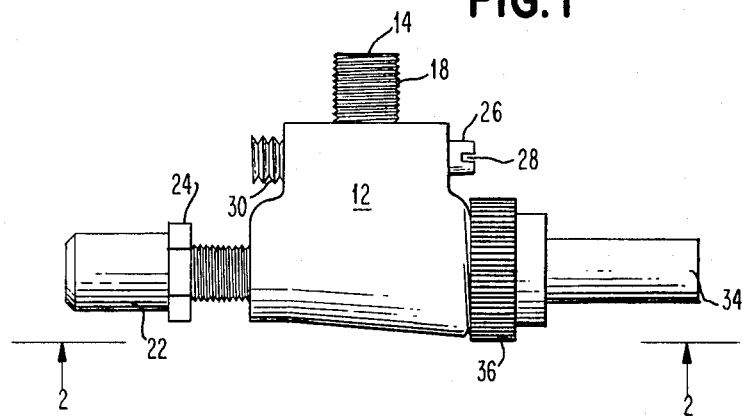
FIG. 1 is a front plan view of the combined rotary plug and shut-off valve in accordance with the present invention.

Referring now to the drawings and more particularly to FIG. 1 thereof, there is illustrated a rotary plug valve 10 having a main housing or casing 12, which provides a passageway for fluid flow between inlet port 14 and outlet port 16. Inlet port 14 is preferably connected to the passage within cylinder 18, the latter being threaded on its exterior surface for positive connection to the supply line or manifold, while outlet port 16 passes through cylinder 20 which is likewise preferably threaded on its exterior surface to connect to a correspondingly threaded nozzle 22 which, after mixture with air, provides the gas output to the burner. The nozzle 22 has a hexagonal nut 24 for adjusting the relative position of the nozzle with respect to the outlet port cylinder 20. The casing 12 includes an opening extending therethrough near the inlet port 14 and transverse to the normal fluid passage. A pin 26 slightly tapered toward a kerf 28 adapted for rotational adjustment by a turning implement such as a screwdriver, extends through the opening, while a threaded member 30, which might comprise in a preferred embodiment a set screw, is also adapted for rotational engagement by a kerf 32, shown more clearly in FIG. 4. The set screw 30 is adapted to press the tapered pin 26 into tight contact with the entire exterior periphery of the opening in which the pin is mounted and through which it extends. While the preferred embodiment utilizes a set screw to provide this adjustment of the tapered pin 26, it will be appreciated that various conventional arrangements for maintaining tapered pin 26 in position and thus prevent gas leakage might be employed.

While not visible in FIG. 1, tapered pin 26 has a circular opening therethrough corresponding in diameter to the size of the passage, and the opening through the pin comprises a portion of the normal passage connecting the inlet to the outlet port. However, when kerf 28 of tapered pin 26 is rotated, the opening through the pin likewise is rotated to another position within the housing 12 out of registration with the passage, thus cutting off gas flow through the passage and permitting the plug or the associated burner unit to be serviced without disconnecting the line. Regulation of the gas flow to the burner unit is manually controlled by valve stem 34, which in conventional installations would be connected directly to the control knob in the burner unit. A knurled handle or knob 36 threaded on its interior surface maintains the plug 38 in contact with the valve seat, as shown more clearly in FIG. 2.

Figure 2:
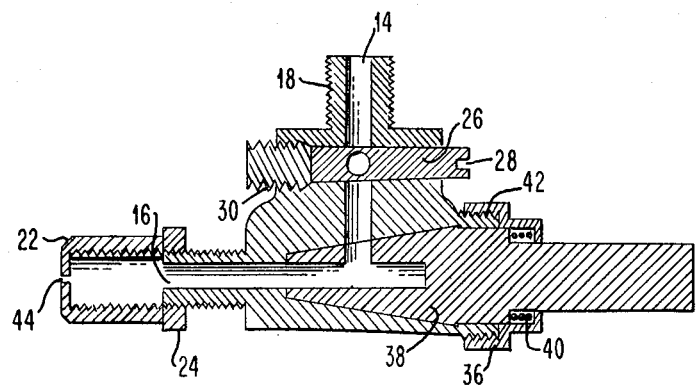
FIG. 2 is a sectional view of the invention taken along the line 2—2 in FIG. 1.

Referring now to FIG. 2, there is illustrated a sectional view of the present invention taken along the line 2—2 of FIG. 1. As shown therein, the plug 38 is mounted within a corresponding opening or valve seat within the valve casing 12 and maintained in position by tension from spring 40. The spring 40 is employed to apply and maintain sufficient spring tension to positively seat the plug 38 within the interior surface of the valve housing. The tapered plug 38 is frusto-conical in shape and has a cylindrical opening therein such that rotation of the plug via valve stem 34 to which it is directly coupled controls the flow of gas passed to the outlet port 16. A limit pin limits the arc of travel of valve stem 34 within limits defined by a slot cut within the exterior threaded section 42 of valve casing 12.

As is well known in the art, conventional rotary plug valves, especially those connected to relatively heavy duty burner units, develop wear and leakage, generally in the plug itself necessitating cleaning, adjustment, and/or replacement of the plug. This most commonly results from drying of the valve sealing grease or possible splatter from the burner unit for example, resulting in hard turning of the control knob and leakage of gas with its potential hazards. To repair or replace the plug 38 or an associated burner unit, the kerf 28 of tapered pin 26 is rotated to the OFF position, which in the preferred embodiment would require approximately a one-quarter turn, thus shutting off the flow of gas at the inlet port. The adjustment knob 36 is then unscrewed from the threaded section 42 of the valve housing, and removed together with spring 40. The rotary plug assembly is then removed by withdrawing the valve stem, cleaned or replaced, as required, and then reassembled in the same manner.

Figure 4:
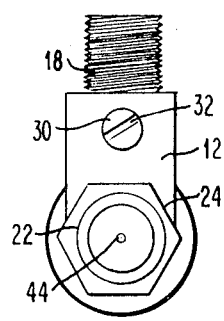
FIGS. 3 and 4 illustrate end views of the present invention illustrated in FIG. 1.
Figure 3:
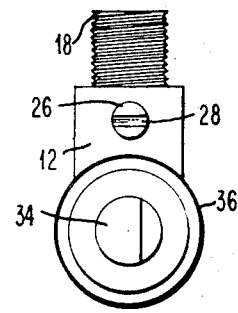

Referring now to FIG. 3, there is shown one end view of the subject invention. As in FIG. 2, the cut-off control kerf 28 for rotating tapered pin 26 is readily accessible, while the valve stem 34, which regulates the gas flow through the rotary plug, is adapted for engagement by a conventional control knob. FIG. 4 illustrates an end view of the outlet port end of the subject invention. As illustrated therein, the kerf 32 of set screw 30 is also readily accessible to set the tapered pin 26 firmly within the opening in the casing.

While a specific rotary valve configuration primarily adapted for use with surface burner units has been illustrated and described as the preferred embodiment of the present invention, the subject invention is not limited thereto. Another contemplated embodiment of the inventon, having primary utility in oven units, comprises a thin metallic shell having an opening therethrough which would fit between the tapered plug and the valve casing. In normal operation, this opening in the shell would register with the normal fluid passage within the valve. To cut off the flow of gas, the shell would be rotated about one-quarter turn through the external control means, effectively shutting off the gas supply thus permitting repair or replacement to be performed in the manner previously described. Such a unit could be employed independently or in combination with a thermostat in the oven.

In addition to the above described uses, the subject invention also provides a rapid and readily located shut-off capability to the individual homeowner in the event of a gas leak at any point beyond the valve. The invention is compact, varying in size only slightly from the conventional rotary plug valve but with substantially increased capability and utility, as heretofore described.

While the invention has been shown and described with reference to preferred embodiments, it will be understood by those skilled in the art that various changes in form and detail may be made without departing from the spirit and scope of the invention.

What is claimed is:
1. A compact gas valve assembly adapted to control the flow of gas to an associated burner and embodying an auxiliary shut-off valve to facilitate repair thereof comprising in combination a unitary housing member defining a gas outlet passageway oriented along a main axis of said member and extending to an outlet port adapted to receive a burner assembly, said housing member further defining a conical valve seat at the inner end of said passageway and coaxial therewith, and a lateral inlet passageway intercepting the side of said valve seat, a main control valve operatively positioned in said valve seat, spring loaded means on said housing member for maintaining said valve in adjusted position therein, said main valve having intercommunicating longitudinal and lateral bores for cooperation with said outlet passageway and said inlet passageway respectively for enabling finely adjustable control of flow of gas from said inlet to outlet passageway as said valve is rotated about its axis, said housing member being further formed with a tapered through aperture intercepting said lateral inlet passageway, a service shut-off valve comprising a tapered pin within said aperture adapted to intercept passage of gas through said inlet passageway when in a first position, and having a transverse bore for admitting gas through said inlet passageway when rotated to a second position, said pin having a tool receiving slot in its smaller end for operation of said shut-off valve, a retainer comprising a set-screw coaxial with said pin and threadedly engaging said housing member to bear against the larger end of said pin, and urge said pin into seated engagement against said tapered aperture, and adapted to function as a lock to prevent inadvertent operation of said service shut-off valve, said service shut-off valve being of small diameter compared to that of said main valve and having its main axis parallel to that of said main valve, whereby said serveice shut-off valve is positioned and adapted to be accommodated within the housing of said main valve without adding substantial bulk thereto, and said service shut-off valve is operable only with the aid of tools to shut off the flow of gas to said main control valve for permitting maintenance operations thereupon.

References Cited
UNITED STATES PATENTS

| | | | |
|---|---|---|---|
| 593,412 | 11/1897 | Bromley | 137—613 |
| 667,301 | 2/1901 | Dredge | 137—613 |
| 1,347,833 | 7/1920 | Bakley | 137—613 |
| 1,315,054 | 9/1919 | Teisseire | 137—613 |
| 3,066,908 | 12/1962 | Floren | 137—613 |

FOREIGN PATENTS

| | | | |
|---|---|---|---|
| 1,054,036 | 4/1959 | Germany | 137—613 |

LAVERNE D. GEIGER, Primary Examiner
W. H. WRIGHT, Assistant Examiner

U.S. Cl. X.R.
251—188